(12) United States Patent
Steenis (10) Patent No.: US 11,081,991 B2
(45) Date of Patent: Aug. 3, 2021

(54) REAL-TIME RESISTANCE ESTIMATION AND ADJUSTMENT FOR PERMANENT MAGNET SYNCHRONOUS MACHINES

(71) Applicant: Microchip Technology Incorporated, Chandler, AZ (US)

(72) Inventor: Joel Steenis, Chandler, AZ (US)

(73) Assignee: MICROCHIP TECHNOLOGY INCORPORATED, Chandler, AZ (US)

( * ) Notice: Subject to any disclaimer, the term of this patent is extended or adjusted under 35 U.S.C. 154(b) by 0 days.

(21) Appl. No.: 16/701,310

(22) Filed: Dec. 3, 2019

(65) Prior Publication Data

US 2021/0083610 A1 Mar. 18, 2021

Related U.S. Application Data

(60) Provisional application No. 62/899,349, filed on Sep. 12, 2019.

(51) Int. Cl.
*H02P 21/13* (2006.01)
*H02P 21/16* (2016.01)

(52) U.S. Cl.
CPC .............. *H02P 21/13* (2013.01); *H02P 21/16* (2016.02)

(58) Field of Classification Search
CPC ...... H02P 1/00; H02P 1/04; H02P 1/20; H02P 1/16; H02P 1/163; H02P 1/18; H02P 1/24; H02P 1/42; H02P 1/426; H02P 1/46; H02P 1/465; H02P 1/48; H02P 3/00; H02P 5/00; H02P 5/2013; H02P 5/01; H02P 5/46; H02P 5/48; H02P 5/54; H02P 5/56; H02P 6/00; H02P 6/005; H02P 6/04; H02P 6/06; H02P 6/08; H02P 6/12; H02P 6/14; H02P 6/17;
(Continued)

(56) References Cited

U.S. PATENT DOCUMENTS 6,069,467 A * 5/2000 Jansen ..................... H02P 6/183
318/801
7,969,112 B2 * 6/2011 Piippo ....................... H02P 21/13
318/609
(Continued)

FOREIGN PATENT DOCUMENTS

KR 101196028 B1 10/2012 ............. G01R 27/08

OTHER PUBLICATIONS

Ribeiro, Luiz Antonio de Souza et al., "Parameter Sensitivity of MRAC Models Employed in IFO-Controlled AC Motor Drive," IEEE Transactions on Industrial Electronics, vol. 44, No. 4, 10 pages, Aug. 1, 1997.
(Continued)

*Primary Examiner* — Antony M Paul
(74) *Attorney, Agent, or Firm* — Slayden Grubert Beard PLLC (57) ABSTRACT

A system includes a motor operating with an angular velocity and an operational current, a motor controller circuit to issue control signals to the motor, and a stator resistance calculation circuit. The calculation circuit is to introduce a perturbation signal to the motor through the control signals issued by the motor controller circuit, observe operations of the motor in response to the perturbation signal, estimate stator resistance of the motor based upon the observations of the operations of the motor in response to the perturbation signal, adjust operation of the motor based upon a changed stator resistance.

20 Claims, 5 Drawing Sheets

(58) Field of Classification Search
CPC .. H02P 6/183; H02P 6/186; H02P 6/26; H02P 6/28; H02P 6/32; H02P 7/245; H02P 7/265; H02P 7/288; H02P 21/00; H02P 21/0003; H02P 27/00; H02P 27/04; H02P 27/06; H02P 27/08; H02P 21/13; H02P 21/14; H02P 23/12; H02P 23/14
See application file for complete search history.

(56) References Cited

U.S. PATENT DOCUMENTS

| | | | |
|---|---|---|---|
| 8,384,338 B2 * | 2/2013 | Lu | H02P 21/16 318/811 |
| 2008/0265823 A1 | 10/2008 | Piippo et al. | 318/609 |
| 2010/0194329 A1 | 8/2010 | Lu | 318/798 |

OTHER PUBLICATIONS

Piippo, Antti et al., "Analysis of an Adaptive Observer for Sensorless Control of PMSM Drives," URL: https://ieeexplore.ieee.org/stamp/stamp.jsp?tp=&arnumber=1569122, 6 pages, Dec. 31, 2005.
International Search Report and Written Opinion, Application No. PCT/US2020/021951, 11 pages, dated Jun. 8, 2020.
Steenis, Joel, "Stator Resistance Estimation for Permanent Magnet Synchronous Machines Using IQ Demodulation," Microchip Technology Incorporated, 7 pages, Aug. 30, 2019.

* cited by examiner

REAL-TIME RESISTANCE ESTIMATION AND ADJUSTMENT FOR PERMANENT MAGNET SYNCHRONOUS MACHINES

RELATED APPLICATIONS

This application claims priority to U.S. Provisional Patent Application No. 62/899,349 filed Sep. 12, 2019, the contents of which are hereby incorporated in their entirety.

FIELD OF THE INVENTION

The present disclosure relates to motor control and, more particularly, to real-time resistance estimation and adjustment for permanent magnet synchronous machines.

BACKGROUND

A pair of periodic signals are said to be in "quadrature" when they differ in phase by 90 degrees, and are said to be in "phase" when they differ in phase by zero degrees. A sinusoid that has been angularly modulated can be decomposed into two amplitude-modulated sinusoids that are offset in phase by one-quarter cycle ($\pi/2$ radians). The original sinusoid and the modulated sinusoids may have the same frequency. The amplitude modulated sinusoids may be known as in-phase and quadrature (IQ) components that are in quadrature with respect to each other.

Figure 1:
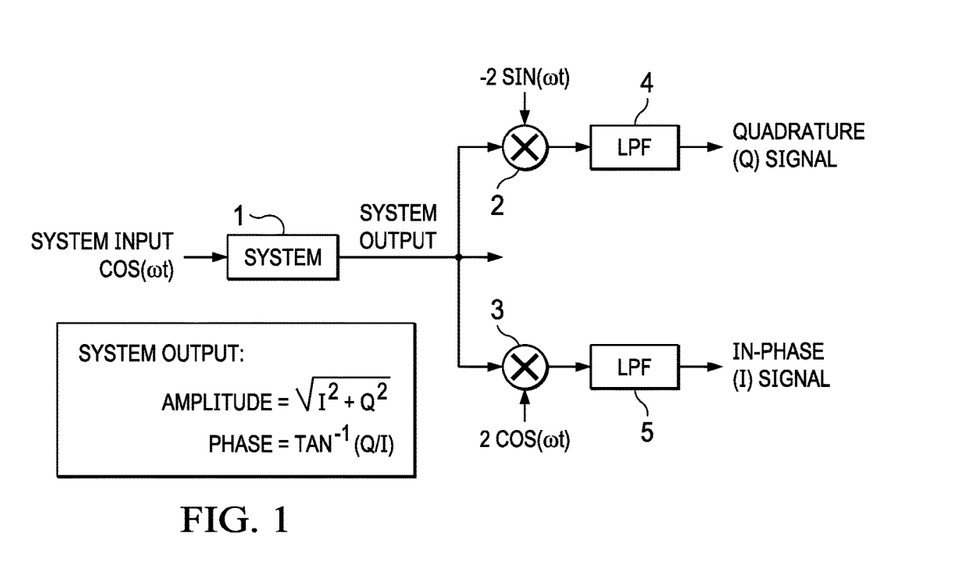
FIG. 1 is an illustration of a block diagram of performing IQ demodulation.

FIG. 1 is an illustration of a block diagram of performing IQ demodulation.

A control system 1 may accept a system input. The system input to control system 1 may be of the form $\cos(\omega t)$. Output of control system 1 may be provided to a first multiplier 2 and second multiplier 3. The output of control system 1 provided to first multiplier 2 may be multiplied by $-2\sin(\omega t)$. The result may be applied to a low pass filter 4. The result from low pass filter 4 may be the quadrature (Q) portion of the output of control system 1. The output of control system 1 provided to second multiplier 3 may be multiplied by $2\cos(\omega t)$. The result may be applied to a low pass filter 5. The result from low pass filter 5 may be the in-phase (I) portion of the output of control system 1.

The amplitude of the output of control system 1 may be given as $$\text{Amplitude} = \sqrt{I^2 + Q^2} \quad \text{(Equation 1)}$$

and the phase of the output of control system 1 may be given as $$\text{Phase} = \tan^{-1}\frac{Q}{I} \quad \text{(Equation 2)}$$

Characteristics of a motor may change. For example, the stator resistance of a motor may change with temperature. Inventors of embodiments of the present disclosure have discovered systems and methods to dynamically estimate, in real-time, such characteristics of motors and make adjustments in response, using IQ signals.

SUMMARY

Embodiments of the present disclosure include a stator resistance calculation circuit. The stator resistance calculation circuit includes analog circuitry, digital circuitry, instructions for execution by a processor, or any suitable combination thereof to introduce a perturbation signal to a motor through control signals issued to the motor. The motor may be configured to operate with an angular velocity and an operational current. The motor may be configured to operate based on the control signals. The stator resistance calculation circuit may be configured to observe operations of the motor in response to the perturbation signal, estimate stator resistance of the motor based upon the observations of the operations of the motor in response to the perturbation signal, and provide a changed stator resistance to adjust operation of the motor.

Embodiments of the present disclosure include a system. The system may include a motor configured to operate with an angular velocity and an operational current, a motor controller circuit configured to issue control signals to the motor, and a stator resistance calculation circuit. The stator resistance calculation circuit may be configured to introduce a perturbation signal to the motor through the control signals issued by the motor controller circuit, observe operations of the motor in response to the perturbation signal, estimate stator resistance of the motor based upon the observations of the operations of the motor in response to the perturbation signal, and adjust operation of the motor based upon a changed stator resistance.

Embodiments of the present disclosure include a method. The method includes operating a motor with an angular velocity and an operational current, issuing control signals to the motor, introducing a perturbation signal to the motor through the control signals, observing operations of the motor in response to the perturbation signal, estimating stator resistance of the motor based upon the observations of the operations of the motor in response to the perturbation signal, and adjusting operation of the motor based upon a changed stator resistance.

DETAILED DESCRIPTION

Embodiments of the present disclosure include a stator resistance calculation circuit. The stator resistance calculation circuit includes analog circuitry, digital circuitry, instructions for execution by a processor, or any suitable combination thereof to introduce a perturbation signal to a motor through control signals issued to the motor. The motor may be configured to operate with an angular velocity and an operational current. The motor may be configured to operate based on the control signals. The stator resistance calculation circuit may include analog circuitry, digital circuitry, instructions for execution by a processor, or any suitable combination thereof to observe operations of the motor in response to the perturbation signal, estimate stator resistance of the motor based upon the observations of the operations of the motor in response to the perturbation signal, and provide a changed stator resistance to adjust operation of the motor. The motor may be any suitable electromechanical motor. The estimated stator resistance may be stored in any suitable manner, such as by a register. The stator resistance calculation circuit may include analog circuitry, digital circuitry, instructions for execution by a processor, or any suitable combination thereof to evaluate the response of the motor before and after the perturbation signal is added. The response may include the gain resulting from application of the perturbation signal. The gain may be evaluated by any of the equations discussed below by using IQ demodulation by multiplying the perturbation signal by the input into the motor to yield an input (which is current iD), multiplying the perturbation signal by the output from motor 104 (which is voltage vD), and dividing the output product by the input product. In combination with any of the above embodiments, the stator resistance calculation circuit may include analog circuitry, digital circuitry, instructions for execution by a processor, or any suitable combination thereof to take into account cross-coupling effects by adjusting the perturbation signal.

In combination with any of the above embodiments, the stator resistance calculation circuit may include analog circuitry, digital circuitry, instructions for execution by a processor, or any suitable combination thereof to estimate stator resistance of the motor further based on calculation of a perturbation gain, the perturbation gain including a ratio of output of the motor to input of the motor.

In combination with any of the above embodiments, the stator resistance calculation circuit may include analog circuitry, digital circuitry, instructions for execution by a processor, or any suitable combination thereof to determine the perturbation gain by multiplying a d-axis component of operational current observed from the motor with a sinusoidal signal to yield the output of the motor, and multiplying a d-axis component of voltage input into the motor with the sinusoidal signal to yield the input of the motor.

In combination with any of the above embodiments, the stator resistance calculation circuit may include analog circuitry, digital circuitry, instructions for execution by a processor, or any suitable combination thereof to estimate stator resistance of the motor further based on subtracting a factor from an inverse of the perturbation gain, the factor including quantifications of stator inductance, electrical frequency, and nominal stator resistance.

In combination with any of the above embodiments, the stator resistance calculation circuit may include analog circuitry, digital circuitry, instructions for execution by a processor, or any suitable combination thereof to estimate stator resistance of the motor further by adjusting output of the motor for cross-coupling effects.

Embodiments of the present disclosure may include a system. The system may include any of the stator resistance calculation circuits of the above embodiments. The system may include the motor configured to operate with an angular velocity and an operational current. The system may include a motor controller circuit including analog circuitry, digital circuitry, instructions for execution by a processor, or any suitable combination thereof configured to issue the control signals to the motor. The motor controller circuit may include analog circuitry, digital circuitry, instructions for execution by a processor, or any suitable combination thereof configured to compare outputs of the motor or performance of the motor against a reference. The reference may be a speed or a current. The control signals may be voltages. The voltages may be in the Q-axis or the D-axis.

In combination with any of the above embodiments, the sinusoidal signal may be the perturbation signal.

In combination with any of the above embodiments, the stator resistance calculation circuit may include analog circuitry, digital circuitry, instructions for execution by a processor, or any suitable combination thereof to introduce the perturbation signal to the motor through the control signals issued by the motor controller circuit by adding the perturbation signal to an output of the motor controller circuit.

In combination with any of the above embodiments, the stator resistance calculation circuit may include analog circuitry, digital circuitry, instructions for execution by a processor, or any suitable combination thereof to introduce the perturbation signal to the motor through the control signals issued by the motor controller circuit by adding the perturbation signal to an input of the motor controller circuit.

Embodiments of the present disclosure may include methods performed by any of the circuits or systems of the above embodiments. The methods may be performed by the operation of circuitry therein or execution of instructions by a processor, or any combination thereof.

Figure 2:
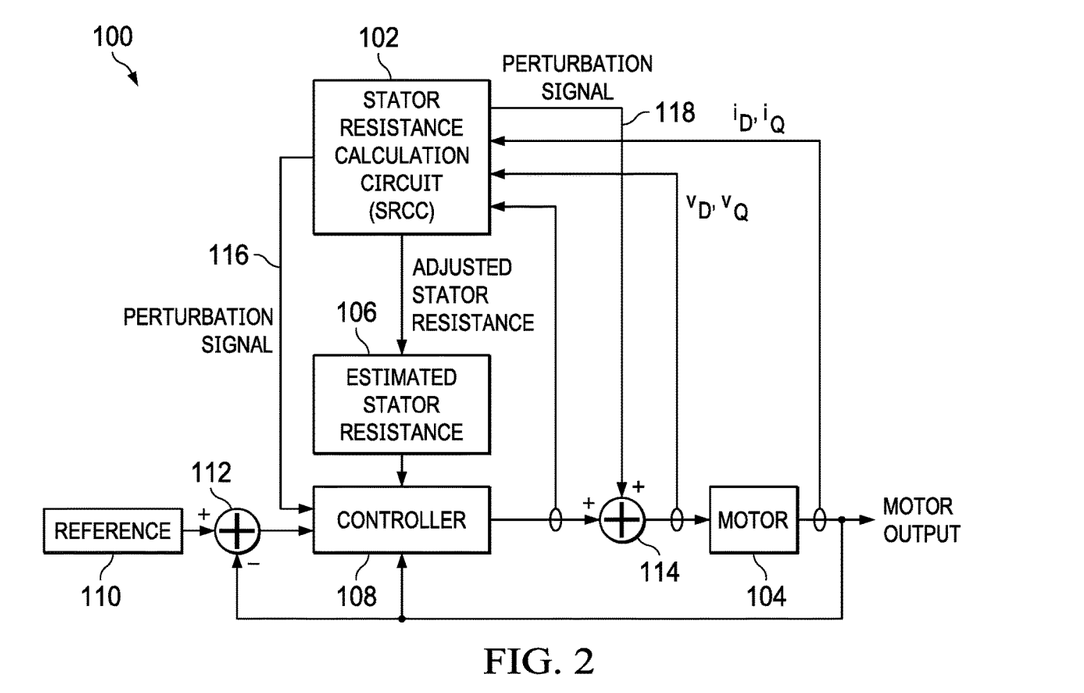
FIG. 2 is an illustration of an example system for performing real-time estimation of resistance of a motor, according to embodiments of the present disclosure.

FIG. 2 is an illustration of an example system 100 for performing real-time estimation of resistance of a motor, according to embodiments of the present disclosure. System 100 may be configured to perform adjustment of components for control of the motor. System 100 may be configured to perform adjustment for control of any suitable motor, such as permanent magnet synchronous motors.

In order to perform real-time estimation resistance of a motor, system 100 may include a stator resistance calculation circuit (SRCC) 102. SRCC 102 may be implemented in any suitable manner, such as analog circuitry, digital circuitry, instructions for execution by a processor (not shown), or any combination thereof. Although shown as a single entity, SRCC 102 may be implemented by any suitable combination of elements, pieces, or modules. SRCC 102 may be configured to estimate the resistance of any suitable motor, such as motor 104.

Motor 104 may be implemented in any suitable manner. For example, motor 104 may be a permanent magnet synchronous motor. Motor 104 may include a stator resistance. Stator resistance may arise from stator windings. Moreover, stator resistance may increase with temperature. Although described simply as a motor, motor 104 may also include various components ascribed to related operation of motor 104 for the purposes of control, such as the motor itself, power transistors, current sense resistors, interconnects, and other supporting mechanisms.

SRCC 102 may be configured to estimate the resistance of motor 104 and to store an adjusted value of stator resistance in a stator resistance register 106. Although described as a register, stator resistance register 106 may be implemented in any suitable manner. Stator resistance register 106 may be configured to store a value of stator resistance of motor 104. Stator resistance register 106 may be originally populated with a value from a design characteristic, manufacturing test or validation, a user or software of system 100, or a sensor in motor 104. Stator resistance register 106 may be configured to be updated by SRCC 102 at any suitable time or any suitable interval. For example, SRCC 102 may be configured to update stator resistance register 106 periodically, once per day, once per a certain number of minutes, seconds, or hours of usage of motor 104, upon demand from a user or software of system 100, or upon startup of operation of motor 104. SRCC 102 may be configured to update stator resistance register 106 in a specifically designated diagnostic mode, or during otherwise normal operation of motor 104. In one embodiment, SRCC 102 may be configured to update stator resistance register 106 without use of a sensor measuring heat or temperature within motor 104.

Stator resistance register 106 may be used by any suitable portion of system 100 to control operation of motor 104. For example, operation of motor 104 may be controlled by a controller 108. Controller 108 may be implemented by analog circuitry, digital circuitry, instructions for execution by a processor, or any suitable combination thereof. Controller 108 may include phase-lock loop (PLL), proportional-integral-derivative (PID) control, or any other suitable control components. Controller 108 may be configured to use data from stator resistance register 106, along with other variables, to control operation of motor 104 to be at a given speed. Such a speed may be defined by a reference 110. Reference 110 may be a designation of a target speed at which motor 104 is to operate. Reference 110 may be set by any suitable entity, such as by software, hardware, or a user of system 100.

Any suitable feedback configuration may be used to control the speed of motor 104. For example, an indication of output of motor 104 may be fed back as negative input to an adder 112. Such indications may include indications of stator current and operation speed. Adder 112 may also accept reference 110 as a positive input. Output of adder 112 may be sent to controller 108. Thus, controller 108 may receive an indication of the error between reference 110 and output of motor 104. Controller 108 may adjust its output to motor 104 in an attempt to cause motor 104 to operate more accurately. In particular, controller 108 may be configured to adjust its output to motor 104 to reduce error between reference signals and measured signals, such as the difference between reference 110 or a current representation thereof and speed or current measured from motor 104.

In one embodiment, SRCC 102 may be configured to estimate stator resistance by introducing a perturbation signal to the control loop controlling motor 104. After introducing the perturbation signal, SRCC 102 may observe results of introducing the perturbation signal, and the results may be in any suitable portion of motor 104. For example, the results of introducing the perturbation signal may be observed at output of motor 104, input of motor 104, input of controller 108, or output of controller 108. SRCC 102 may be configured to estimate stator resistance by introducing a perturbation signal to any suitable portion of the control loop controlling motor 104. In a further embodiment, SRCC 102 may be configured to estimate stator resistance by introducing a perturbation signal 116 as a positive or negative input to components in controller 108, by introducing perturbation signal 116 at an input to adder 114, it being understood that in another embodiment perturbation signal 116 may be introduced at an input to adder 304 through introducing perturbation signal 116 to controller 108, discussed in further detail below.

SRCC 102 may be configured to receive any suitable inputs for observing results of introducing a perturbation signal to the control loop controlling motor 104. For example, SRCC 102 may be configured to receive an indication of output of motor 104, an indication of input to motor 104, an indication of input of controller 108 (not shown), an indication of output of controller 108, or an indication of reference 110 (not shown). Moreover, controller 108 may be configured to receive an indication of output of motor 104.

Figure 3:
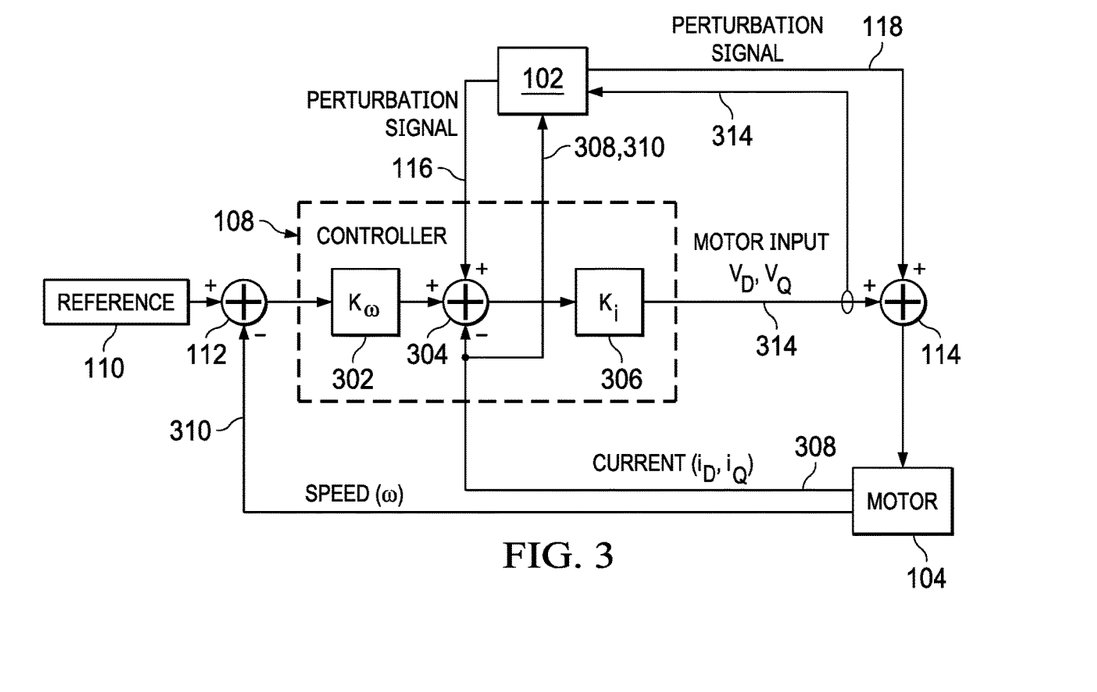
FIG. 3 is a more detailed illustration of portions of the system, such as a controller, according to embodiments of the present disclosure.

FIG. 3 is a more detailed illustration of portions of system 100, such as controller 108, according to embodiments of the present disclosure. In system 100, an indication of output of motor 104 is illustrated as broken down into speed ($\omega$) 310 provided to adder 112 and current ($i_D$, $i_Q$) 308 provided to controller 108. Both such outputs may also be provided to SRCC 102 as indications of output of motor 104 was provided to SRCC 102 as shown in FIG. 2. Output of controller 108 may be given as motor input 314, and may include d and q components $v_D$, $v_Q$.

Controller 108 may include logic blocks 302, 306. Logic blocks 302, 306 may be implemented in any suitable manner, such as by analog circuitry, digital circuitry, instructions for execution by a processor, or any combination thereof. Logic block 302, also denoted as $K_\omega$, may be configured to operate as a speed controller. Logic block 302, as $K_\omega$, may be a dynamic controller with output-input units of Amperes/radian or current/frequency. Given a non-zero error calculated by adder 112 as input, logic block 302 may be configured to adjust or correct speed of motor 104. Logic block 302 may include an output defined in terms of current. For example, if the output of motor 104 is 101 radians per second, reference 110 is 100 radians per second, and perturbation signal 116 is zero, then the output of adder 112 is the difference in speed, and thus input to controller 108 may be one radian per second. Logic block 302 may multiply the input to controller 108 by a determined factor ($K_\omega$), or otherwise provide a transfer function for the one radian per second input. Output of logic block 302 may be provided to an adder 304, which may be configured to find an error in current used by motor 104. Adder 304 may accept the output of logic block 302 as positive input and an indication of the output of motor 104, in a particular embodiment an indication of current components $i_D$, $i_Q$, as negative input. The error determined by adder 304 may be provided to logic block 306. The error determined by adder 304 may represent the difference between the current necessary to achieve reference 110 and the current actually used by motor 104. Logic block 306, also denoted as $K_i$, may be configured to operate as a current controller. Logic block 306 may be configured to, given a difference in current that is to be used by motor 104, convert such a difference in current into voltage or voltages to be used by motor 104. Logic block 306 may apply a transfer function to its input, or multiply its input times a factor, to yield its output. In controller 108, logic block 302, logic block 306, or both logic blocks 302, 306 may use stator resistance register 106 (not shown) to make their determinations of output. For example, the particular coefficients used by logic blocks 302, 306 may incorporate a value of stator resistance stored in stator resistance register 106.

Returning to FIG. 2, in one embodiment, one or more of perturbation signals 116, 118 may be made at frequencies below pole/zero frequencies of controller 108 or motor 104. In another embodiment, SRCC 102 may be configured to use IQ demodulation to quantify the magnitude of the perturbation signal at the input and output of the system, calculate low frequency gain of the system by taking the ratio of output/input signals, and compare the low frequency gain to a model. Calculation of a precise value of stator resistance may be impractical in terms of time or processing resources. Thus, in yet another embodiment, in order to efficiently control motor 104, SRCC 102 may be configured to estimate, but not necessarily exactly calculate, stator resistance. Thus, the value of stator resistance stored in stator resistance register 106 may represent an estimate of stator resistance, and not a true measurement.

The change in current produced by motor 104 may be given by the following state space equation $$\begin{bmatrix} \frac{di_D}{dt} \\ \frac{di_Q}{dt} \end{bmatrix} = \begin{bmatrix} -R_S/L_S & \omega_e \\ -\omega_e & -R_S/L_S \end{bmatrix} \begin{bmatrix} i_D \\ i_Q \end{bmatrix} + \begin{bmatrix} V_D/L_S \\ V_Q/L_S \end{bmatrix} + \begin{bmatrix} 0 \\ -\frac{K_e \omega_m}{L_s} \end{bmatrix} \quad \text{(Equation 3)}$$

and the following direct current (DC) gain equation $$G_{DC} = \begin{bmatrix} \frac{i_D}{V_D} = \frac{R_S}{R_S^2 + L_S^2 \omega_e^2} & \frac{i_D}{V_Q} = \frac{\omega_e L_S}{R_S^2 + L_S^2 \omega_e^2} \\ \frac{i_Q}{V_D} = \frac{-\omega_e L_S}{R_S^2 + L_S^2 \omega_e^2} & \frac{i_Q}{V_Q} = \frac{R_S}{R_S^2 + L_S^2 \omega_e^2} \end{bmatrix} \quad \text{(Equation 4)}$$

wherein $R_S$ is the stator resistance, $L_s$ is a quantification of the stator inductance, $\omega_e$ is a quantification of the electrical frequency, $\omega_m$ is the mechanical frequency, $K_e$ is the back EMF constant, $v_D$ is the D-axis voltage, $v_Q$ is the Q-axis voltage, $i_D$ is the D-axis current, and $i_Q$ is the Q-axis current.

Figure 4:
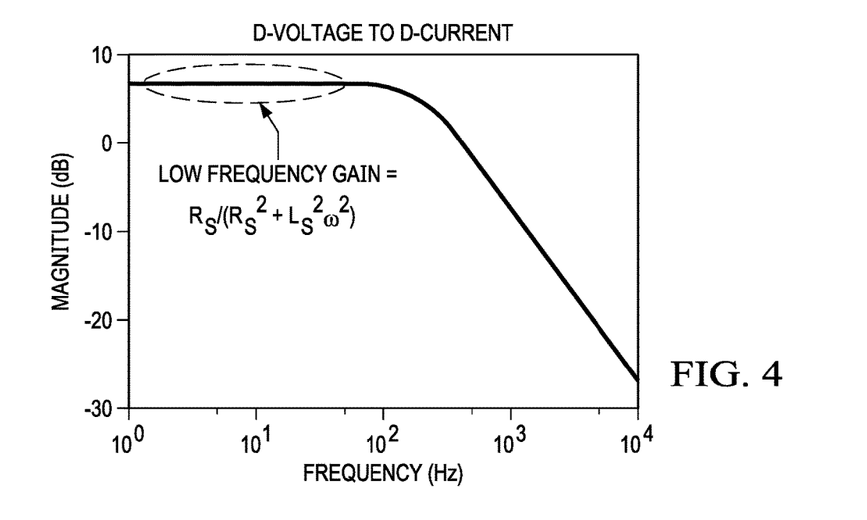
FIG. 4 is an illustration of low frequency gain for an example motor, according to embodiments of the present disclosure.

FIG. 4 is an illustration of low frequency gain for an example motor, according to embodiments of the present disclosure. Illustrated is a Bode plot of a transfer function from D-axis voltage to D-axis current, represented on the ordinate in dB, for different frequencies. The motor may be, for example, a Hurst DMA0204024B101CLB1617 motor. As shown, at lower frequencies, such as those less than 100 Hertz, the gain is relatively constant. The gain of the highlighted portion of the Bode plot may be given as $$\text{Gain at low frequencies} = \frac{R_S}{R_S^2 + L_S^2 \omega_e^2} \quad \text{(Equation 5)}$$

From the gain at low frequencies, SRCC 102 may be configured to estimate stator resistance $R_S$. For example, the DC gain ($G_{DC}$) may be given as $$G_{DC} = \frac{i_D}{v_D} = \gamma = \frac{R_S}{R_S^2 + L_S^2 \omega_e^2} \quad \text{(Equation 6)}$$

and thus $$R_S = \frac{1 \pm \sqrt{1 - 4\gamma^2 \omega_e^2}}{2\gamma} \quad \text{(Equation 7)}$$

leading to $R_S$ being approximately equal to a value dynamically defined by stator inductance and electrical frequency, given as $$R_S \approx \frac{1}{\gamma} - \frac{L_S^2 \omega_e^2}{R_{SNominal}} = \frac{v_D}{i_D} - \frac{L_S^2 \omega_e^2}{R_{SNominal}} \quad \text{(Equation 8)}$$

wherein $1/\gamma$ is the low frequency transimpedance gain ($v_D/i_D$), and $R_{SNominal}$ is a quantification of the value of $R_S$ at a particular operating temperature or other specified set of operating conditions.

Returning to FIG. 2, SRCC 102 may be configured to use Equation 8 to estimate a stator resistance value. Equation 8 may be calculated using circuitry without the need for a processor. SRCC 102 may be configured to issue at least one of perturbation signals 116, 118. To calculate the low frequency gain, $G_{DC}$, it may be assumed that there is no phase delay from the input of motor 104 to the output of motor 104. If there is no phase delay, then the in-phase component of motor 104 output signal may be calculated and the quadrature component of the signal unused.

Accordingly, SRCC 102 may be configured to issue one of perturbation signals 116, 118, observe the results, and use the perturbation signal, the result, and Equation 8 to determine stator resistance.

Figure 5:
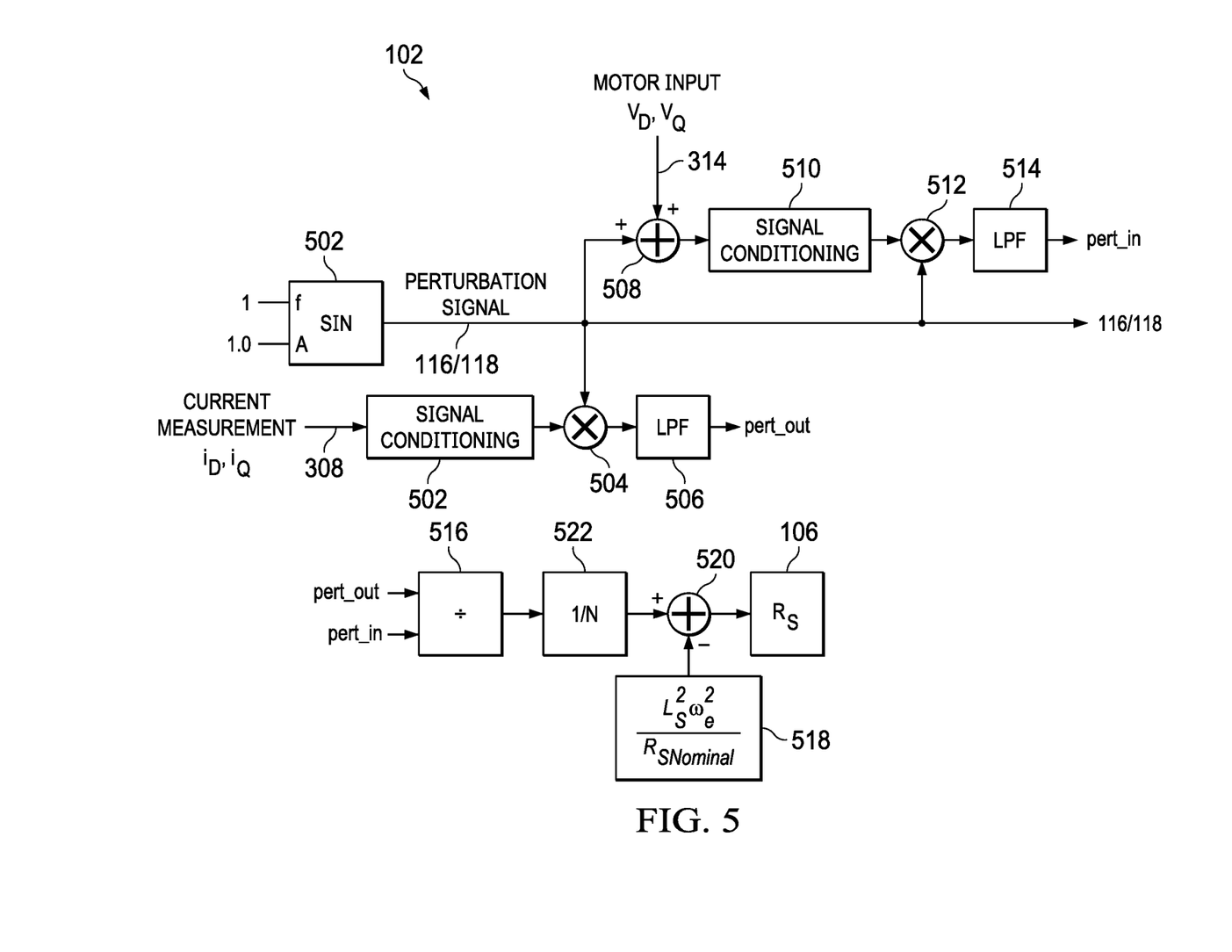
FIG. 5 is a more detailed illustration of the system, including a calculation circuit, according to embodiments of the present disclosure.

FIG. 5 is a more detailed illustration of system 100, including SRCC 102, according to embodiments of the present disclosure.

Perturbation signals 116, 118 may be on any suitable form, frequency, amplitude, and phase. For example, perturbation signals 116, 118 may be sinusoidal signals such as a sine function with a 0.1 volt (V) or Ampere (A) amplitude and a frequency of 1 Hz. Perturbation signal 116 as applied to element 112 as shown in FIG. 3, below, may be expressed in Amperes. Perturbation signal 118 as applied to element 114 may be expressed in volts. Accordingly, SRCC 102 may include a sine generation circuit 502. Sine generation circuit 502 may be implemented by any suitable combination of analog circuitry, digital circuitry, instructions for execution by a processor, or any combination thereof. Sine generation circuit 502 may be configured to generate a sin wave signal with a frequency and amplitude according to its inputs, which may be 0.1V for the amplitude and 1.0 Hz for the frequency. The output of sine generation circuit 502 may be used for perturbation signal 116 or perturbation signal 118. The choice of whether perturbation signal 116 or perturbation signal 118 is to be used in system 100 may be made based upon design, user selection, a setting, or other suitable criteria.

SRCC 102 may be configured to evaluate the effects of the generated perturbation signal in system 100. SRCC 102 may be configured to so-evaluate such effects by determining the gain resulting from application of perturbation signal 116 or perturbation signal 118. The gain may be evaluated using IQ demodulation by multiplying perturbation signal 116 or perturbation signal 118 by the input into motor 104 to yield an input (which is current $i_D$), multiplying perturbation signal 116 or perturbation signal 118 by the output from motor 104 (which is voltage $v_D$), and dividing the output product by the input product. Such a gain may then be used in Equation 8 to determine stator resistance.

For example, current measurement 308 may be input into SRCC 102. Current measurement 308 may be conditioned using a signal conditioning circuit 502. Signal conditioning circuit 502 may be implemented by any suitable combination of analog circuitry, digital circuitry, instructions for execution by a processor, or any combination thereof. Signal conditioning circuit 502 may be configured to format current measurement 308 in any suitable manner so as to make it usable or compatible with other operations in SRCC 102. For example, signal conditioning circuit 502 may be configured to change the data structure used to represent current measurement 308 (such as changing from a integer or real number with a lower number of bits to an integer or real number with a higher number of bits), or apply a linear, fixed gain to current measurement 308.

The output of signal conditioning circuit 502 may be multiplied by perturbation signal 116 or perturbation signal 118 by a multiplier 504. The result of multiplier 504 may be provided to a low pass filter 506. The output of low pass filter 506 may be designated as pert_out, and may be the in-phase component of the d-axis current $i_D$ at the perturbation frequency.

Motor input 314 may be input into SRCC 102. Motor input 314 may be added to the perturbation signal with adder 508. The result of adder 508 may be conditioned using a signal conditioning circuit 510. Signal conditioning circuit 510 may be implemented by any suitable combination of analog circuitry, digital circuitry, instructions for execution by a processor, or any combination thereof. Signal conditioning circuit 510 may be configured to format the sum of current motor input 314 and the perturbation signal 116 or perturbation signal 118 in any suitable manner so as to make it usable or compatible with other operations in SRCC 102. For example, signal conditioning circuit 510 may be configured to change the data structure used to represent the result of adder 508 (such as changing from a integer or real number with a lower number of bits to an integer or real number with a higher number of bits), or apply a linear, fixed gain to the result of adder 508.

Alternatively, input may be made to SRCC 102 of input into motor 104 with the result of adder 114 as shown in FIG. 1. In such a case, such an input might not need to be added to the perturbation signal 116 or perturbation signal 118 with adder 508. Such an input might be provided directly to signal conditioning circuit 510.

The output of signal conditioning circuit 510 may be multiplied by the perturbation signal 116 or perturbation signal 118 by a multiplier 512. The result of multiplier 512 may be provided to a low pass filter 514. The output of low pass filter 514 may be designated as pert_in, and may be the d-axis voltage, $v_D$.

SRCC 102 may be configured to determine the gain associated with the perturbation signal, determined by calculating pert_out/pert_in, and given as γ. The gain may be calculated by a division block 516 to divide pert_out by pert_in to yield γ. The result may be inverted by an inversion block 522 to yield 1/γ. In another implementation, the inputs to division block 516 may be reversed and inversion block 522 might not be used in order to simply yield 1/γ. This result in turn may be lessened by a factor 518 equal to $$\frac{L_S^2 \omega_e^2}{R_{SNominal}}.$$

Factor 518 may be calculated or stored as a known value. The frequency in factor 518 may be 1 Hz, or another frequency used by sine generation circuit 502. The result, which is the result of Equation 8, may be stored in stator resistance register 106.

Once stator resistance register 106 has been updated, system 100 may take any appropriate corrective action. For example, controller 108 may adjust coefficients used to control operation of motor 104, alert software or a user of system 100, estimate temperature of motor 104, or log the changed data. Estimated stator resistance may be used to update controller parameters such as $K_i$ in logic block 306. Estimated stator resistance may be used to estimate motor temperature, which is related to stator resistance. If motor temperature is too hot, then operation of the motor may be shut down, or operational speed reduced. If a large resistance is estimated, then a fault may be diagnosed and the motor shut down.

Application of perturbation signals 116 or 118 to system 100 may cause reactions or perturbations primarily in the d-axis that are evaluated as discussed above. However, application of perturbation signals 116 or 118 to system 100 may also cause reactions or perturbations in the q-axis as well. These reactions or perturbations in the q-channel may contribute to the d-axis output. This may be a form of cross-coupling. The cross-coupling effect may be small. The equations used above to estimate stator resistance may ignore this cross-coupling effect. In a further embodiment, however, the cross-coupling effect may be considered when estimating stator resistance.

Figure 6:
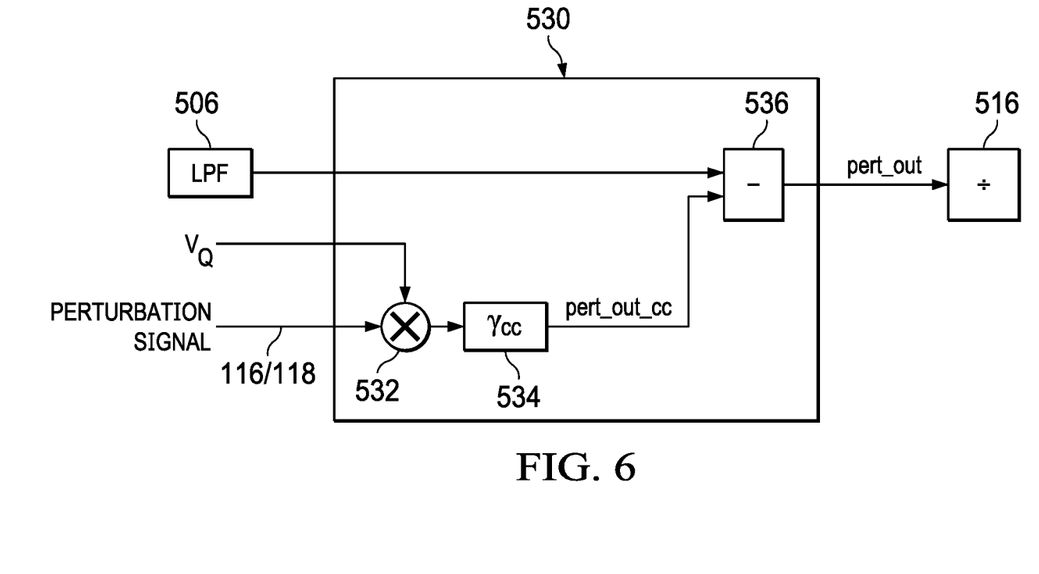
FIG. 6 is a more detailed illustration of portions of the system, including the calculation circuit, to take into account cross-coupling effects, according to embodiments of the present disclosure.

FIG. 6 is a more detailed illustration of portions of system 100, including SRCC 102, to take into account cross-coupling effects, according to embodiments of the present disclosure. SRCC 102 may include a cross-coupling adjustment circuit (CCAC) 530. In one embodiment, SRCC 102 might not include CCAC 530, and thus not take into account cross-coupling effects, wherein output from low-pass filter 506 is input as pert_out into division block 516. In another embodiment, SRCC 102 might include CCAC 530, and thus take into account cross-coupling effects. In such a case, CCAC 530 may take input from low-pass filter 506 and produce pert_out as output to division block 516 by adjusting the input received from low-pass filter 506. In yet another embodiment, SRCC 102 might include CCAC 530, but not enable CCAC 530, and thus not take into account cross-coupling effects. In such a case, a switch or other suitable mechanism may be used to route output from low-pass filter 506 and produce such output, unchanged, as pert_out to division block 516.

In the example of FIG. 6, input may be received at CCAC 530 from low-pass filter 506, $v_Q$ from logic block 306, and the perturbation signal 116/118. CCAC 530 may be configured to account for cross-coupling effects by determining a correction factor, referenced as pert_out_cc. Pert_out_cc may be subtracted from the output of low pass filter 506, which in the absence of CCAC 530 would be pert_out. Any suitable implementation may be used to calculate pert_out_cc, such as digital circuitry, analog circuitry, instructions for execution by a processor, or any suitable combination thereof.

For example, pert_out_cc may be determined by taking the q-axis voltage input to motor 104, $v_Q$, and multiplying $v_Q$ by the perturbation signal 116/118 with multiplier 532, then multiplying the result by a gain block 534 with the nominal cross-coupling gain, $\gamma_{cc}$. The nominal cross-coupling gain, $\gamma_{cc}$, may be given by nominal parameter values and Equation 4. The result may be pert_out_cc. Pert_out_cc may be subtracted using a subtractor/adder 536 from the input from low-pass filter 506, and the result used as pert_out.

Figure 7:
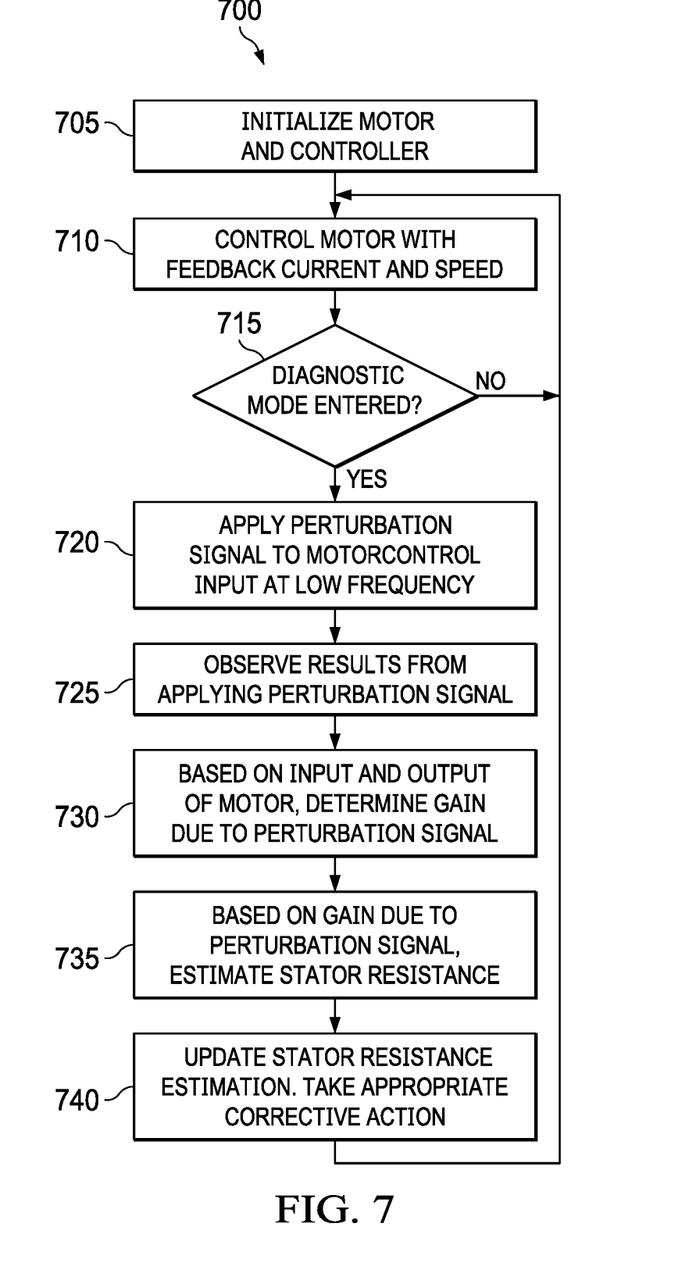
FIG. 7 is an illustration of a method for estimating stator resistance, according to embodiments of the present disclosure.

FIG. 7 is an illustration of a method 600 for estimating stator resistance, according to embodiments of the present disclosure. Method 600 may be performed by any of the elements of FIGS. 2-6 as discussed above. For example, method 600 may be performed by SRCC 102. Method 600 may be performed by analog circuitry, digital circuitry, instructions stored in a machine-readable medium that, when loaded and executed by a processor, perform steps of the method, or any combination thereof. Method 600 may be initialized and terminate at any suitable step. Various steps of method 600 may be repeated, omitted, performed in parallel or recursively with respect to one another, or performed in a different sequence.

At step 605, a motor and controller may be initialized. The controller may determine various operating parameters, such as stator resistance of the motor, or an estimated stator resistance of the motor.

At step 610, the controller may control the motor using any suitable feedback control mechanism to operate at a designated setpoint. The controller may use the motor speed and the motor current in its feedback.

At step 615, it may be determined whether a diagnostic mode is to be entered. Such a mode may include determining changes to stator resistance of the motor. The diagnostic mode may be initiated, for example, periodically, upon demand from a user or software, upon a change in temperature or other operating condition, upon determining an error, or after a certain time of use of the motor. If diagnostic mode is to be entered, method 600 may proceed to step 620. If diagnostic mode is not going to be entered, method 600 may return to step 610.

At step 620, a perturbation or excitation signal may be applied to motor control input, or to input to a controller for the motor. The perturbation signal may be a sinusoidal signal with a low frequency. At 625, results from applying the perturbation signal may be observed in output of the motor. In one embodiment, the d-axis output may be observed. At step 630, based upon the input and output of the motor, a gain due to the perturbation input may be determined. In one embodiment, the d-axis output observed at 625 may be multiplied by the perturbation signal at 620 as a perturbation output. The perturbation output may be adjusted for any cross-coupling effects. The perturbation input may be given as the input to the motor multiplied by the perturbation signal. The gain may be obtained by dividing the perturbation output by the perturbation input. At step 635, based upon the determined gain, stator resistance of the motor may be estimated. The stator resistance may be estimated according to Equation 8 and the determined gain. At step 640, the stator resistance may be updated and corrective action taken, such as notifying an end user, or performing motor control with the updated stator resistance. Method 600 may repeat at step 610.

Although example embodiments have been described above, other variations and embodiments may be made from this disclosure without departing from the spirit and scope of these embodiments.

I claim:

1. A system, comprising:
a motor configured to operate with an angular velocity and an operational current;
a motor controller circuit configured to issue control signals to the motor; and
a stator resistance calculation circuit, configured to:
introduce a perturbation signal to the motor through the control signals issued by the motor controller circuit;
observe operations of the motor in response to the perturbation signal;
estimate stator resistance of the motor based upon the observations of the operations of the motor in response to the perturbation signal;
adjust operation of the motor based upon a changed stator resistance; and
estimate stator resistance of the motor further based on calculation of a perturbation gain, the perturbation gain including a ratio of output of the motor to input of the motor.

2. The system of claim 1, wherein the stator resistance calculation circuit is further configured to determine the perturbation gain by:
multiplication of a d-axis component of operational current observed from the motor with a sinusoidal signal to yield the output of the motor; and
multiplication of a d-axis component of voltage input into the motor with the sinusoidal signal to yield the input of the motor.

3. The system of claim 2, wherein the sinusoidal signal is the perturbation signal.

4. The system of claim 1, wherein the stator resistance calculation circuit is further configured to estimate stator resistance of the motor further based on subtraction of a factor from an inverse of the perturbation gain, the factor including quantifications of stator inductance, electrical frequency, and nominal stator resistance.

5. The system of claim 1, wherein the stator resistance calculation circuit is further configured to estimate stator resistance of the motor further by adjustment of output of the motor for cross-coupling effects.

6. A system, comprising:
a motor configured to operate with an angular velocity and an operational current;
a motor controller circuit configured to issue control signals to the motor; and
a stator resistance calculation circuit, configured to:
introduce a perturbation signal to the motor through the control signals issued by the motor controller circuit;
observe operations of the motor in response to the perturbation signal;
estimate stator resistance of the motor based upon the observations of the operations of the motor in response to the perturbation signal;
adjust operation of the motor based upon a changed stator resistance; and
introduce the perturbation signal to the motor through the control signals issued by the motor controller circuit by addition of the perturbation signal to an output of the motor controller circuit.

7. A system, comprising:
a motor configured to operate with an angular velocity and an operational current;
a motor controller circuit configured to issue control signals to the motor; and
a stator resistance calculation circuit, configured to:
introduce a perturbation signal to the motor through the control signals issued by the motor controller circuit;
observe operations of the motor in response to the perturbation signal;
estimate stator resistance of the motor based upon the observations of the operations of the motor in response to the perturbation signal;
adjust operation of the motor based upon a changed stator resistance; and
introduce the perturbation signal to the motor through the control signals issued by the motor controller circuit by addition of the perturbation signal to an input of the motor controller circuit.

8. A method, comprising:
operating a motor with an angular velocity and an operational current;
issuing control signals to the motor;

introducing a perturbation signal to the motor through the control signals;

observing operations of the motor in response to the perturbation signal;

estimating stator resistance of the motor based upon the observations of the operations of the motor in response to the perturbation signal;

adjusting operation of the motor based upon a changed stator resistance; and estimating stator resistance of the motor further based on calculation of a perturbation gain, the perturbation gain including a ratio of output of the motor to input of the motor.

9. The method of claim 8, further comprising determining the perturbation gain by:

multiplying a d-axis component of operational current observed from the motor with a sinusoidal signal to yield the output of the motor; and multiplying a d-axis component of voltage input into the motor with the sinusoidal signal to yield the input of the motor.

10. The method of claim 9, wherein the sinusoidal signal is the perturbation signal.

11. The method of claim 8, further comprising estimating stator resistance of the motor further based on subtracting a factor from an inverse of the perturbation gain, the factor including quantifications of stator inductance, electrical frequency, and nominal stator resistance.

12. The method of claim 8, further comprising estimating stator resistance of the motor further by adjusting output of the motor for cross-coupling effects.

13. A method, comprising:

operating a motor with an angular velocity and an operational current;

issuing control signals to the motor;

introducing a perturbation signal to the motor through the control signals;

observing operations of the motor in response to the perturbation signal;

estimating stator resistance of the motor based upon the observations of the operations of the motor in response to the perturbation signal;

adjusting operation of the motor based upon a changed stator resistance; and introducing the perturbation signal to the motor through the control signals by adding the perturbation signal to an output of a motor controller circuit.

14. A method, comprising:

operating a motor with an angular velocity and an operational current;

issuing control signals to the motor;

introducing a perturbation signal to the motor through the control signals;

observing operations of the motor in response to the perturbation signal;

estimating stator resistance of the motor based upon the observations of the operations of the motor in response to the perturbation signal;

adjusting operation of the motor based upon a changed stator resistance; and introducing the perturbation signal to the motor through the control signals by adding the perturbation signal to an input of the motor controller circuit.

15. A stator resistance calculation circuit, comprising a non-transitory machine-readable medium, the medium including instructions for causing a processor to:

introduce a perturbation signal to a motor through control signals issued to the motor, the motor configured to operate with an angular velocity and an operational current, the motor configured to operate based on the control signals;

observe operations of the motor in response to the perturbation signal;

estimate stator resistance of the motor based upon the observations of the operations of the motor in response to the perturbation signal;

provide a changed stator resistance to adjust operation of the motor; and estimate stator resistance of the motor further based on calculation of a perturbation gain, the perturbation gain including a ratio of output of the motor to input of the motor.

16. The stator resistance calculation circuit of claim 15, further comprising instructions for determining the perturbation gain by:

multiplication of a d-axis component of operational current observed from the motor with a sinusoidal signal to yield the output of the motor; and multiplication of a d-axis component of voltage input into the motor with the sinusoidal signal to yield the input of the motor.

17. The stator resistance calculation circuit of claim 15, further comprising instructions for estimating stator resistance of the motor further based on subtraction of a factor from an inverse of the perturbation gain, the factor including quantifications of stator inductance, electrical frequency, and nominal stator resistance.

18. The stator resistance calculation circuit of claim 15, further comprising instructions for estimating stator resistance of the motor further by adjustment of output of the motor for cross-coupling effects.

19. A stator resistance calculation circuit, comprising a non-transitory machine-readable medium, the medium including instructions for causing a processor to:

introduce a perturbation signal to a motor through control signals issued to the motor, the motor configured to operate with an angular velocity and an operational current, the motor configured to operate based on the control signals;

observe operations of the motor in response to the perturbation signal;

estimate stator resistance of the motor based upon the observations of the operations of the motor in response to the perturbation signal;

provide a changed stator resistance to adjust operation of the motor; and introduce the perturbation signal to the motor through the control signals issued by the motor controller circuit by addition of the perturbation signal to an output of the motor controller circuit.

20. A stator resistance calculation circuit, comprising a non-transitory machine-readable medium, the medium including instructions for causing a processor to:

introduce a perturbation signal to a motor through control signals issued to the motor, the motor configured to operate with an angular velocity and an operational current, the motor configured to operate based on the control signals;

observe operations of the motor in response to the perturbation signal;

estimate stator resistance of the motor based upon the observations of the operations of the motor in response to the perturbation signal; and introduce the perturbation signal to the motor through the control signals issued by the motor controller circuit by addition of the perturbation signal to an input of the motor controller circuit.

\* \* \* \* \*